United States Patent [19]

Harima et al.

[11] Patent Number: 5,659,946
[45] Date of Patent: Aug. 26, 1997

[54] METHOD OF MANUFACTURING A MULTICELL BATTERY

[75] Inventors: Yukio Harima, Osaka; Masao Nakamura, Chigasaki; Takashi Nonoshita, Fujisawa; Isao Uehara, Isehara; Saburo Nakatsuka, Kyoto, all of Japan

[73] Assignee: Matsushita Electric Industrial Co., Ltd., Osaka, Japan

[21] Appl. No.: 573,503

[22] Filed: Dec. 15, 1995

[30] Foreign Application Priority Data

Dec. 16, 1994 [JP] Japan ..................... 6-313417

[51] Int. Cl.⁶ ........................................ H01M 6/00
[52] U.S. Cl. ................ 29/623.4; 429/157; 429/158; 429/160
[58] Field of Search ....................... 429/157, 158, 429/159, 160; 29/623.4

[56] References Cited

U.S. PATENT DOCUMENTS

| 3,615,867 | 10/1971 | Cich et al. . | |
|---|---|---|---|
| 3,748,182 | 7/1973 | Brown | 136/111 |
| 3,969,142 | 7/1976 | Greatbatch et al. | 136/83 R |
| 4,002,808 | 1/1977 | Fafa | 429/157 |
| 4,060,670 | 11/1977 | Tamminen | 429/154 |
| 4,190,702 | 2/1980 | Pun et al. | 429/4 |
| 5,204,194 | 4/1993 | Miller et al. . | |

FOREIGN PATENT DOCUMENTS

| 1188709 | 9/1959 | France . |
| 2335962 | 7/1977 | France . |
| 2451332 | 5/1975 | Germany . |
| 59-169076 | 9/1984 | Japan . |
| 62-26761 | 2/1987 | Japan . |
| 63-105460 | 5/1988 | Japan . |

OTHER PUBLICATIONS

European Search Report dated Apr. 11, 1996.

*Primary Examiner*—Prince Willis, Jr.
*Assistant Examiner*—Jonathan S. Krueger
*Attorney, Agent, or Firm*—Ratner & Prestia

[57] ABSTRACT

A method of manufacturing a multicell battery by connecting a plurality of cells in series, with the purposes of improving the charge/discharge characteristics and enhancing the productivity of the manufacturing process. A convex electrode terminal formed in the upper part of one cell is welded to one end of a lead tab, and another cell is disposed above the cell connected to the lead tab so that the center lines of the two cells are parallel. A flat electrode terminal formed in the lower part of the other cell and another end of the lead tab are welded indirectly.

9 Claims, 8 Drawing Sheets

METHOD OF MANUFACTURING A MULTICELL BATTERY

BACKGROUND OF THE INVENTION

The present invention relates to a multicell battery composed by connecting a plurality of cells.

Recently, multicell batteries formed by connecting a plurality of cells in series have come to be used widely. A diagram for explaining the method of connecting a conventional multicell battery is shown in FIG. 8. As shown in FIG. 8, one end of a lead tab 115 is preliminarily spot-welded to a first electrode terminal 113 having a convex shape provided at an upper end of a first cell 111. The lead tab 115 is bent at right angle. The other end of the lead tab 115 is then welded to a second electrode terminal 124 having a flat shape positioned on the bottom of a case 122 of a second cell 121. Consequently, the lead tab 115 is folded 90 degrees so that the center line (B) of the second cell 121 connected to the first cell 111 may be aligned with the center line (A) of the first cell 111. In such process, a conventional multicell battery was manufactured.

In the conventional manufacturing method, however, the lead tab 115 must be cut longer than required length. Therefore, depending on the length of the lead tab 115, the internal resistance of the multicell battery increases. Another problem was the high manufacturing cost. The first cell 111 and second cell 121 must be welded through the lead tab 115, and the lead tab 115 connecting the first cell 111 and second cell 121 must be folded 90 degrees, and hence complicated processes were needed, and the productivity was poor.

It is hence a goal of the method of manufacturing a multicell battery of the present invention to decrease the internal resistance of the multicell battery, enhance productivity, and lower the manufacturing cost.

SUMMARY OF THE INVENTION

The invention is a method of manufacturing a multicell battery by connecting a plurality of cells in series.

A multicell battery including two cells connected in series comprises:

(1) a first cell out of the plurality of cells having a first electrode terminal formed in the middle of an upper pan, and a second electrode terminal formed in a lower part, (2) a second cell out of the plurality of cells in series with the first cell, having a third electrode terminal formed in the upper part, and a fourth electrode terminal formed in the lower part, and (3) a lead tab having a first end connected to the first electrode terminal of the first cell, and a second end connected to the fourth electrode terminal of the second cell.

The method of manufacturing such a multicell battery comprises the following steps:

(a) a step of connecting the first end of the lead tab to the first electrode terminal of the first cell, (b) a step of positioning the second cell in series above the first cell connected to the first end of the lead tab, (c) a step of positioning a pair of weld electrodes consisting of a first weld electrode and a second weld electrode between the first cell and the second cell, and positioning the second end of the lead tab between the second weld electrode and the fourth electrode terminal, (d) a step of bringing the first cell and the second cell closer to each other, isolating electrically the first weld electrode and second weld electrode from the first electrode terminal, contacting the first weld electrode and one end of the fourth electrode terminal, and contacting the other end of the fourth electrode terminal, the second end of the lead tab, and the second weld electrode, and (e) a step of applying a current between the first weld electrode and second weld electrode, and welding the fourth electrode terminal and the second end of the lead tab, by the current flowing in the first weld electrode, fourth electrode terminal of the second cell, the second end of the lead tab, and the second weld electrode.

The above steps define the method of manufacturing a multicell battery connecting three cells in series in accord with the invention. Further embodiments of the invention include the additional steps of:

(f) connecting a first end of a second lead tab to the third electrode terminal, (g) positioning a third cell in series above the second cell connected to the first end of the second lead tab, (h) positioning a pair of second weld electrodes consisting of a third weld electrode and a fourth weld electrode between the second cell and the third cell, and positioning the second end of the second lead tab between the fourth weld electrode and sixth electrode terminal, (i) bringing the second cell and the third cell closer to each other, isolating electrically the third weld electrode and fourth weld electrode from the third electrode terminal, contacting the third weld electrode and an end of the sixth electrode terminal, and contacting the other end of the sixth electrode terminal, the second end of the second lead tab, and the fourth weld electrode, and (j) applying a current between the third weld electrode and the fourth weld electrode, and welding the sixth electrode terminal and the second end of the second lead tab.

A multicell battery connecting four or more cells in series is manufactured by repeating the above steps.

A different method of manufacturing a multicell battery connecting three or more cells in series comprises the following steps:

(a) connecting a first end of a first lead tab to a first electrode terminal of a first cell, (b) connecting a first end of a second lead tab to a third electrode terminal of a second cell, (c) connecting a first end of a third lead tab to a fifth electrode terminal of a third cell, (d) positioning the second cell connected to the first end of the second lead tab, above the first cell connected to the first end of the first lead tab, (e) positioning a first pair of weld electrodes consisting of a first weld electrode and a second weld electrode between the first cell and the second cell and positioning the second end of the first lead tab between the second weld electrode and the fourth electrode terminal, (f) bringing the first cell and second cell closer to each other, isolating electrically the first weld electrode and second weld electrode from the first electrode terminal, contacting the first weld electrode and an end of the fourth electrode terminal, and contacting the other end of the fourth electrode terminal, the second end of the first lead tab, and the second weld electrode,

3

(g) applying a current between the first weld electrode and second weld electrode, and welding the fourth electrode terminal and the second end of the first lead tab, (h) positioning the third cell connected to first end of the third lead tab, above the second cell connected to the first end of the second lead tab, (i) positioning a second pair of weld electrodes consisting of a third weld electrode and a fourth weld electrode between the second cell and the third cell and positioning the second end of the second lead tab between the fourth weld electrode and sixth electrode terminal, (j) bringing the second cell and third cell closer to each other, isolating electrically the third weld electrode and the fourth weld electrode from the third electrode of the second cell, contacting the third weld electrode and an end of the sixth electrode terminal, and contacting the other end of the sixth electrode terminal, second end of the second lead tab, and the fourth weld electrode, and (k) applying a current between the third weld electrode and the fourth weld electrode, and welding the sixth electrode terminal and the second end of the second lead tab.

The above described manufacturing methods do not require folding the lead tab by 90 degrees. Therefore, the length of the lead tab can be shortened to about ½ of that used in the prior art. As the length of the lead tab is shortened, the internal resistance of the multicell battery decreases, and hence charge/discharge characteristics may be improved. Moreover, the manufacturing process is simplified, and hence the productivity is enhanced, and the manufacturing cost is lowered. In addition, as a result of shortening the length of the lead tab, the material cost is reduced, and hence the manufacturing cost is further reduced.

REFERENCE NUMERALS

Figure 1:
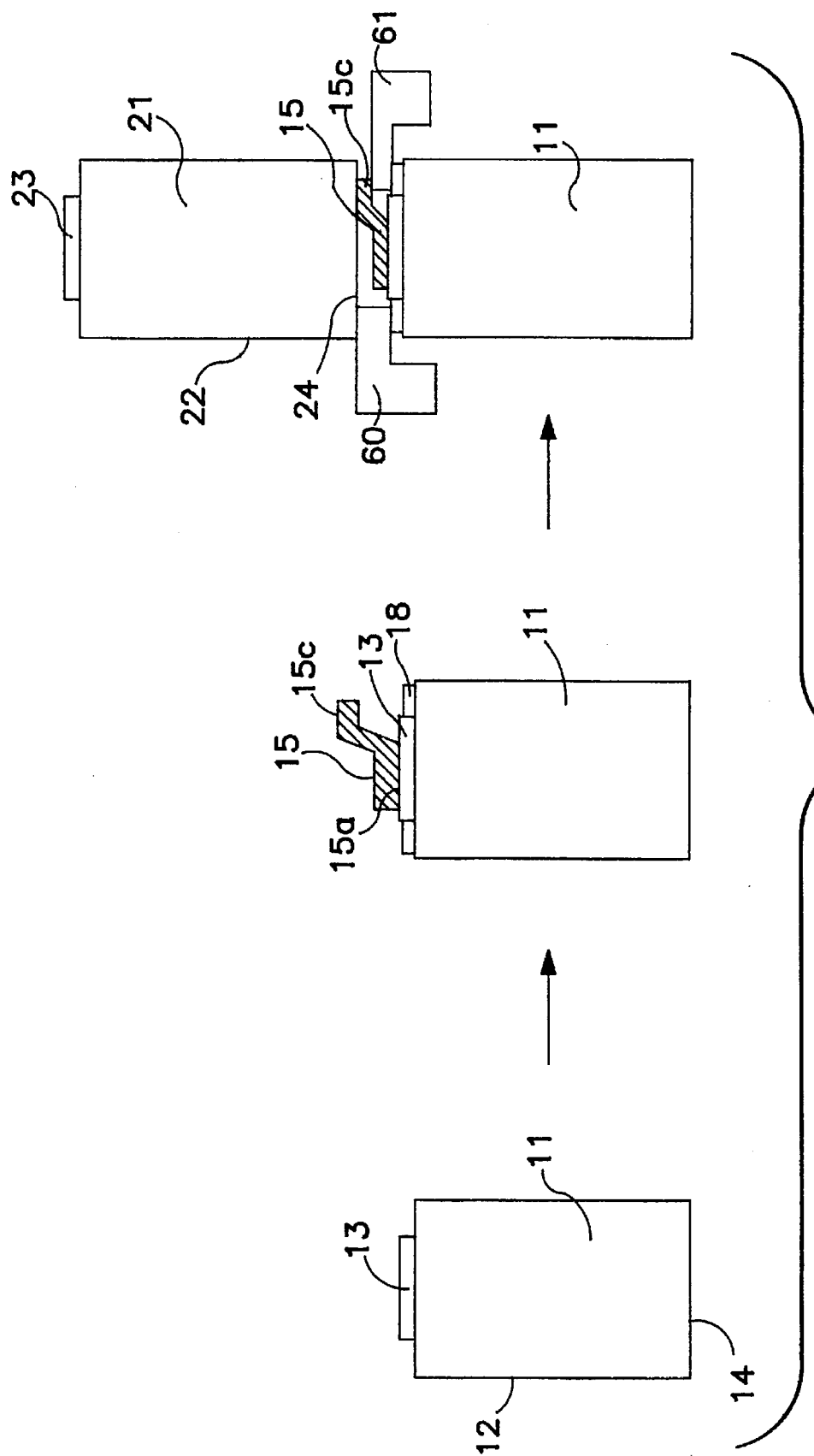
FIG. 1 is a diagram illustrating the manufacturing process according to a first embodiment of the invention.

11 First cell
12 Case of first cell
13 First electrode terminal of first cell
14 Second electrode terminal of first cell
X Center line of first cell
15 Lead tab
15a First end of lead tab
15b Middle of lead tab
15c Second end of lead tab

4

17 Protrusion
18 Paper ring
21 Second cell
22 Case of second cell
23 Third electrode terminal of second cell
24 Fourth electrode terminal of second cell
25 Second lead tab
Y Center line of second cell
31 Third cell
32 Case of third cell
33 Fifth electrode terminal of third cell
34 Sixth electrode terminal of third cell
35 Third lead tab
41 First cell
44 Second electrode terminal of first cell
45 Lead tab
45a First end of lead tab
45b Second end of lead tab
51 Second cell
53 Third electrode terminal of second cell
60 First weld electrode
61 Second weld electrode
62 Pressure adjusting spring
70 Third weld electrode
71 Fourth weld electrode
72 Second pressure adjusting spring
80 First weld electrode
81 Second weld electrode
83 Electric insulator panel
84 Electric insulator panel
86 Pressure adjusting spring
111 First cell of prior art
113 First electrode terminal of first cell of prior art
115 Lead tab of prior art
121 Second cell of prior art
122 Case of second cell of prior art
124 Second electrode terminal of second cell of prior art

DESCRIPTION OF THE PREFERRED EMBODIMENT

With reference to the drawings, several embodiments of a multicell battery of the invention are described in detail below.

Embodiment 1

FIG. 1 is a diagram explaining the manufacturing process according to an embodiment for manufacturing a multicell battery of the invention. The multicell battery of the invention is constructed by connecting a plurality of cells in series, and the manufacturing process for connecting two cells is shown in FIG. 1 as an embodiment thereof.

In FIG. 1, a first cell 11 is connected in series to a second cell 21 through a lead tab 15. The first cell 11 is in the form of a column or a rectangular parallelepiped. The first cell 11 is composed of a case 12, a functional substance (not shown) for producing the cell voltage contained in the case 12, and a first electrode terminal 13. The bottom of the case 12 is a second electrode terminal 14 which is a negative pole. The second electrode terminal 14 is flat. The first electrode terminal 13 is a positive pole, and is disposed so as to project from the middle of the upper end of the first cell 11. The first electrode terminal 13 is convex.

The second cell 21 has the same structure as the first cell 11. That is, the second cell 21 is in the form of a column or a rectangular parallelepiped. The second cell 21 is composed of a case 22, a functional substance (not shown) for producing the cell voltage contained in the case 22, and a third electrode terminal 23. The bottom of the case 22 is a fourth electrode terminal 24 which is a negative pole. The fourth electrode terminal 24 is flat. The third electrode terminal 23 is a positive pole, and is disposed so as to project from the middle of the upper end of the second cell 21. The third electrode terminal 23 is convex.

In FIG. 1, first a paper ring 18 which is electrically insulative is inserted around the upper end of the first cell 11 excluding the first electrode terminal 13.

Figure 4A:
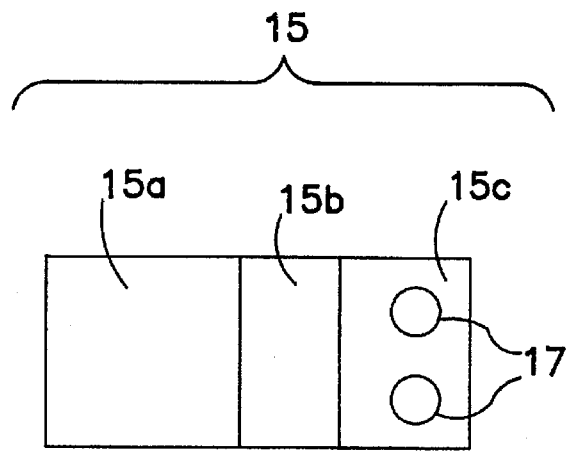
FIG. 4(a)–(c) show the shape of the lead tab used in one embodiment of the invention.
Figure 4B:
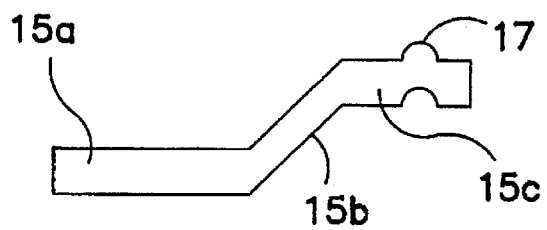
Figure 4C:
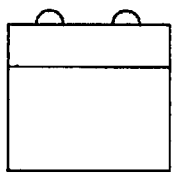

Next, a lead tab 15 is connected to the first electrode terminal 13 of the first cell 11. The shape of this lead tab 15, in an exemplary embodiment, is shown in FIGS. 4(a)–4(c). FIG. 4(a) is a planar view of the lead tab 15, FIG. 4(b) is a front view, and FIG. 4(c) is a side view. The lead rob 15 measures about 12.5 mm in length, about 7 mm in width, and about 0.18 mm in thickness. The middle portion 15b is bent obliquely so that the first end 15a and second end 15c of the lead tab 15 may be parallel to each other. A small protrusion 17 is formed at the second end 15c. The material of the lead tab 15 is pure nickel or nickel-plated iron. The size, shape, and material of the lead tab 15 maybe varied depending on the shape and size of the cell.

The first end 15a of the lead tab 15 is spot-welded to the first electrode terminal 13 of the first cell 11. Then, using a pair of weld electrodes consisting of a first weld electrode 60 and a second weld electrode 61, the second end 15c of the lead tab 15 connected to the first cell 11 and the second electrode terminal 24 of the second cell 21 are connected. Thus, a multicell battery is manufactured.

Figure 2:
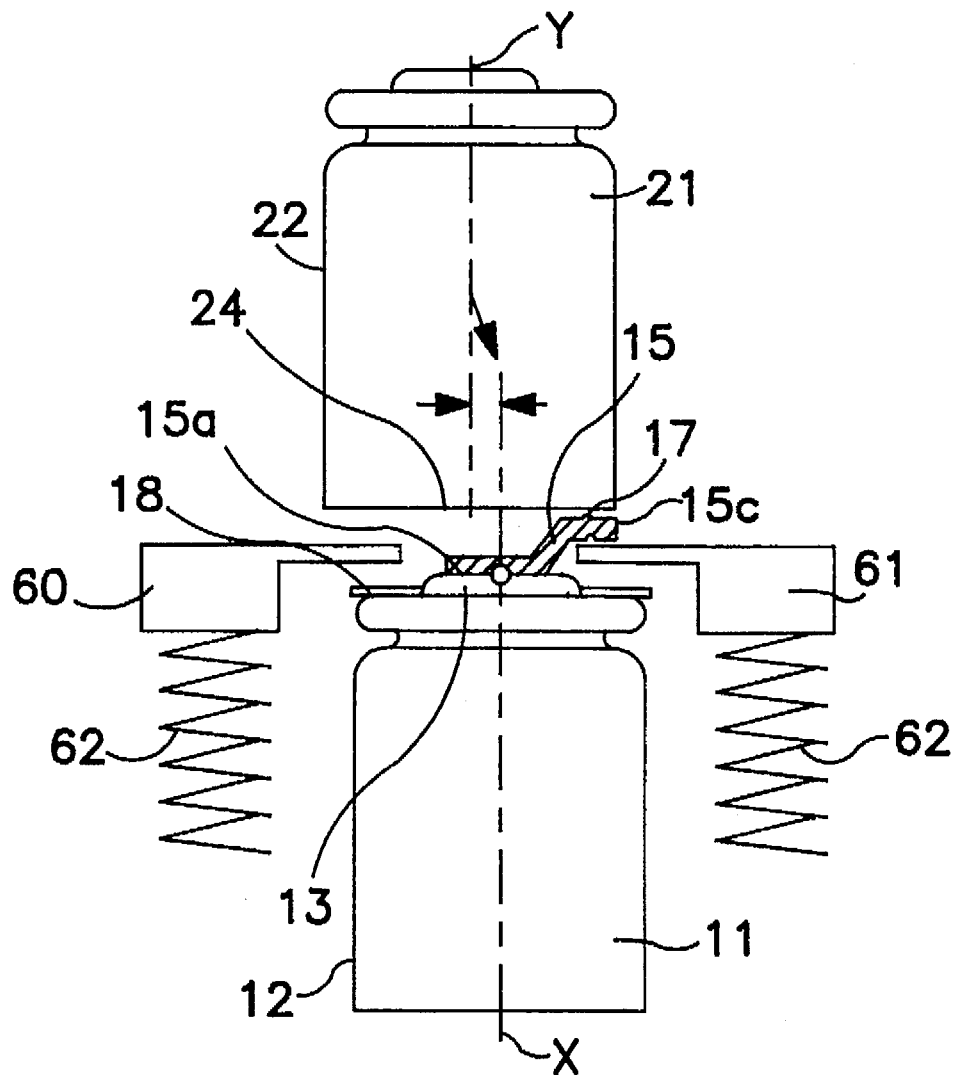
FIG. 2 is a schematic diagram before the welding of two cells in one embodiment of the invention.

The method of connecting two cells is further described below. FIG. 2 is a schematic diagram showing the state of two cells before welding. In FIG. 2, the first end 15a of the lead tab 15 is connected to the first electrode terminal 13 of the first cell 11. The paper ring 18 is an electric insulator. Above the first cell 11 and the lead tab 15, the second cell 21 is disposed vertically so that the center lines (X, Y) of the both cells are parallel. At this time, the center line (Y) of the second cell 21 is slightly shifted to the left side (that is, towards the first end 15a of the lead tab 15) of the center line (X) of the first cell 11. This is because the second cell 21 moves slightly to the right side (that is, towards the second end 15c of the lead tab 15) after completion of welding, so that the center line (X) of the first cell 11 may be aligned with the center line (Y) of the second cell 21 after welding.

In such a configuration, the second end 15c of the lead tab 15 and the fourth electrode terminal 24 of the second cell 21 are welded. The welding method is described specifically below. The welding device comprises mutually confronting first weld electrode 60 and second weld electrode 61, pressure adjusting springs 62 disposed beneath the first weld electrode 60 and the second weld electrode 61, and a welding power source (not shown). The first weld electrode 60 and the second weld electrode 61 are positioned between the first cell 11 and second cell 21. The first weld electrode 60 is positioned between the electrically insulating paper ring 18 disposed above the first cell 11, and the bottom of the case 22 of the second cell 21. The second weld electrode 61 is positioned so that the second end 15c of the lead tab 15 may be positioned between the second weld electrode 61 and the fourth electrode terminal 24 of the second cell 21.

Figure 3:
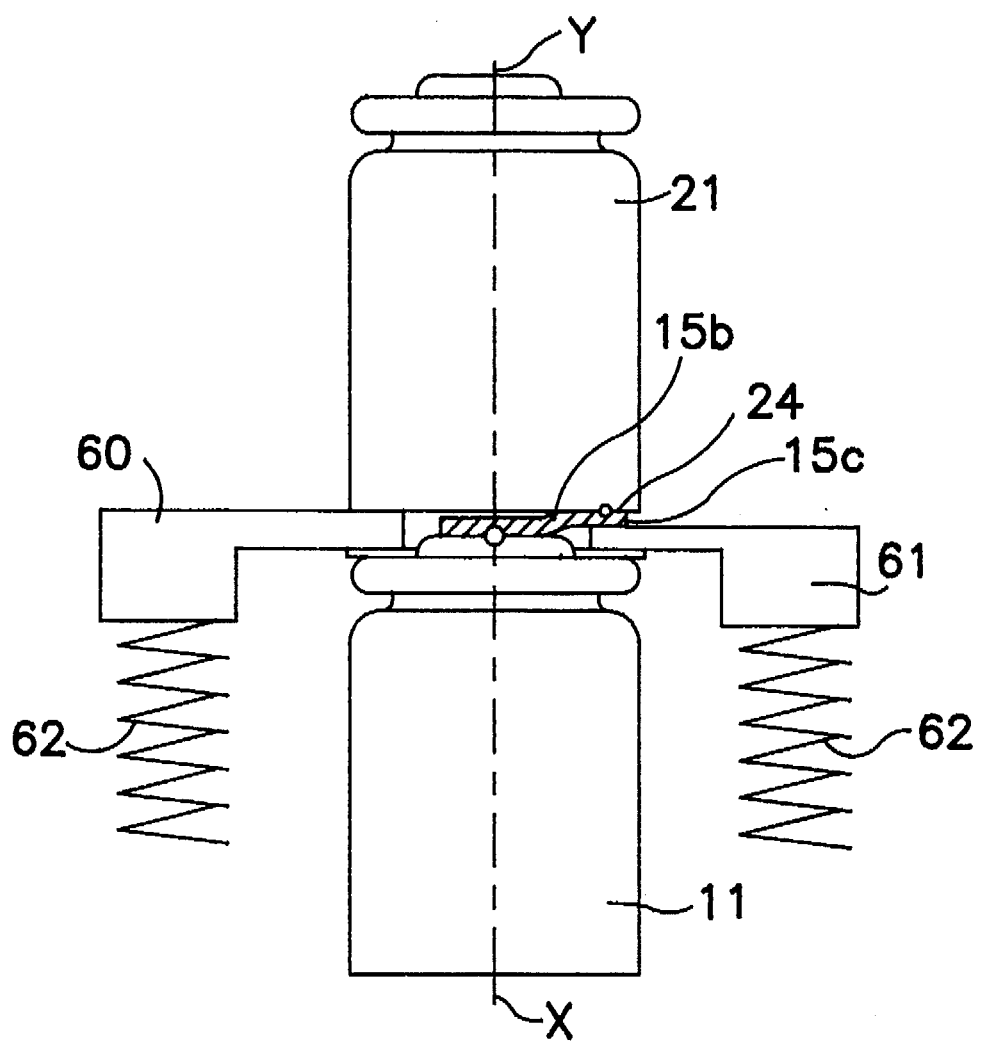
FIG. 3 is a schematic diagram during the welding of two cells in one embodiment of the invention.

FIG. 3 is a schematic diagram explaining the state of two cells at the time of welding. In FIG. 3, the second cell 21 moves downward from the state shown in FIG. 2. At this time, the bent middle portion 15b of the lead tab 15 is almost straight, and at the same time the center line (X) of the first cell 11 and the center line (Y) of the second cell 21 are almost aligned. Moreover, by the pressing force of the pressure adjusting spring 62, one end of the fourth electrode terminal 24 of the second cell 21, the second end 15c of the first lead tab 15, and the second weld electrode 61 contact with each other. Further, the other end of the fourth electrode terminal 24 of the second cell 21 and the first weld electrode 60 contact each other. The pressing force at the contact positions is adjusted by the pressure adjusting springs 62 which are compressive springs. When a proper pressing force is applied to the weld position, a current is supplied from the welding power source (not shown) between the first weld electrode 60 and second weld electrode 61. The supplied current sequentially flows from the first weld electrode 60 into the bottom (that is, the fourth electrode terminal 24) of the case 22 of the second cell 21, the second end 15c of the lead tab 15, and the second weld electrode 61. In this case, because of the electrically insulating paper ring 18, the first weld electrode 60 and second weld electrode 61 are electrically isolated, not electrically contacting with the first electrode 13 of the first cell 11. By this current, the fourth electrode terminal 24 of the second cell 21 and the second end 15c of the lead tab 15 are welded indirectly. In this case, it is also effective to pass current to the first weld electrode 60 from the second weld electrode 61. By forming the protrusion 17 at the second end 15c of the lead tab 15, so that the lead tab 15 and the fourth electrode terminal 24 of the second cell 21 may contact each other at the protrusion 17, the welding current is prevented from shunting, and a more stable weld is realized. In this method, the first cell 11 and second cell 21 are connected in series with their center lines aligned on a straight line.

In this manufacturing method of a multicell battery, the length of the lead tab can be shortened to about ½ of that used in the prior art. As the length of the lead tab becomes shorter, the internal resistance of the multicell battery is decreased, and hence the charge/discharge characteristics may be improved. Moreover, as the lead tab is shortened, the material cost is lowered corresponding to the curtailed length. At the same time, the manufacturing process is simplified, and the manufacturing cost is lowered, and industrial mass production is more easily realized.

In this embodiment, the following alternative method is also possible, and the same effects as above are obtained.

Instead of the configuration in which the center line (X) of the first cell 11 and the center line (Y) of the second cell 21 are aligned, the cells of a multicell battery may be deviated by a desired distance. In this case, by adjusting the mutual positions of first cell 11, lead tab 15 and second cell 21 before welding, a multicell battery having cells deviated by an arbitrary distance is manufactured. At the time of-welding, instead of moving the second cell 21, a manufacturing method of a multicell battery which includes moving the first cell 11 is also effective.

Embodiment 2

Figure 5:
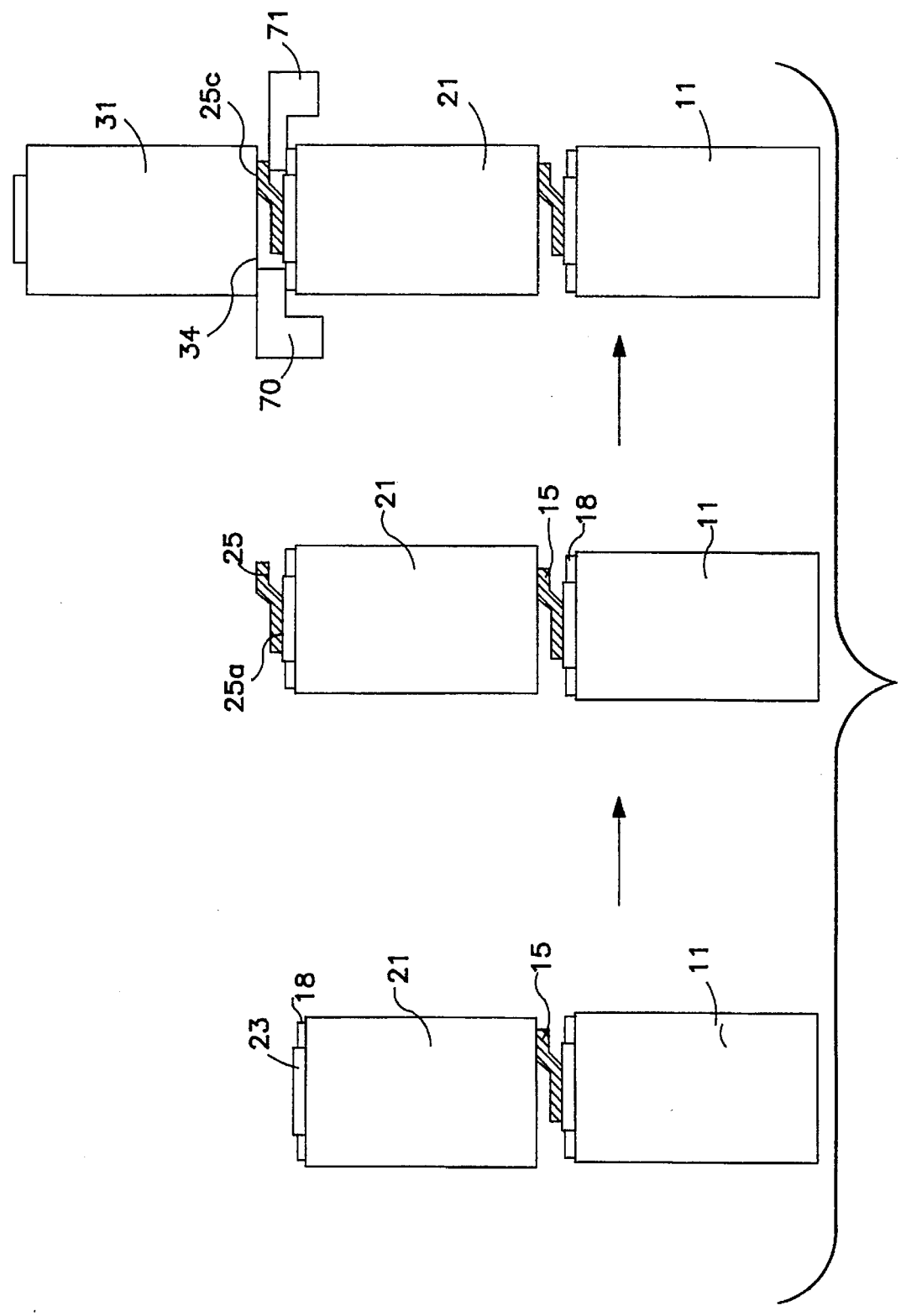
FIG. 5 is a schematic diagram of a method of manufacturing a multicell battery for connecting three cells in series.

Referring now to FIG. 5, an embodiment of a manufacturing method of a multicell battery by connecting three or more cells is described below. FIG. 5 is a schematic diagram of a manufacturing method of a multicell battery by connecting three cells in series.

First, a first end 25a of a second lead tab 25 is connected to a third electrode terminal 23 of a multicell battery composed of first cell 11, second cell 21 and lead tab 15 manufactured in accordance with the first embodiment. The second lead tab 25 is the same material and shape as the lead tab 15 used in the first embodiment. Next, as described in the first embodiment; a third cell 31 is welded series, above the second cell 21. That is, the third cell 31 is positioned above the second cell 21 welded to the first end 25a of the second lead tab 25.

Consequently, a third weld electrode 70 is positioned between one end of a sixth electrode terminal 34 in the bottom of the third cell 31, and an upper end of the second cell 21, and a fourth weld electrode 71 is positioned between the other end of the sixth electrode terminal 34, and the other upper end of the second cell 21 through a second end 25c of the second lead tab 25.

By pressing the third cell 31 downward, the third weld electrode 70 and one end of the sixth electrode terminal 34 of the third cell 31 contact each other, and the other end of the sixth electrode terminal 34 of the third cell 31 and the fourth weld electrode 71 contact with each other through a second end 25c of the second lead tab 25. In this state, by applying a current between the third weld electrode 70 and fourth weld electrode 71, the current flows from the third weld electrode 70 into the sixth electrode terminal 34 of the third cell 31, the second end 25c of the second lead tab 25, and the fourth weld electrode 71. By this current the other end of the sixth electrode terminal 34 of the third cell 31 and the second end 25c of the second lead tab 25 are welded together.

In this case, instead of the third weld electrode 70 and fourth weld electrode 71, the first weld electrode 60 and second weld electrode 61 used in the first embodiment may be used. In this method, a multicell battery including three cells connected in series is manufactured.

By repeating this manufacturing method, a multicell battery composed of any desired number of cells may be manufactured.

Embodiment 3

Figure 6:
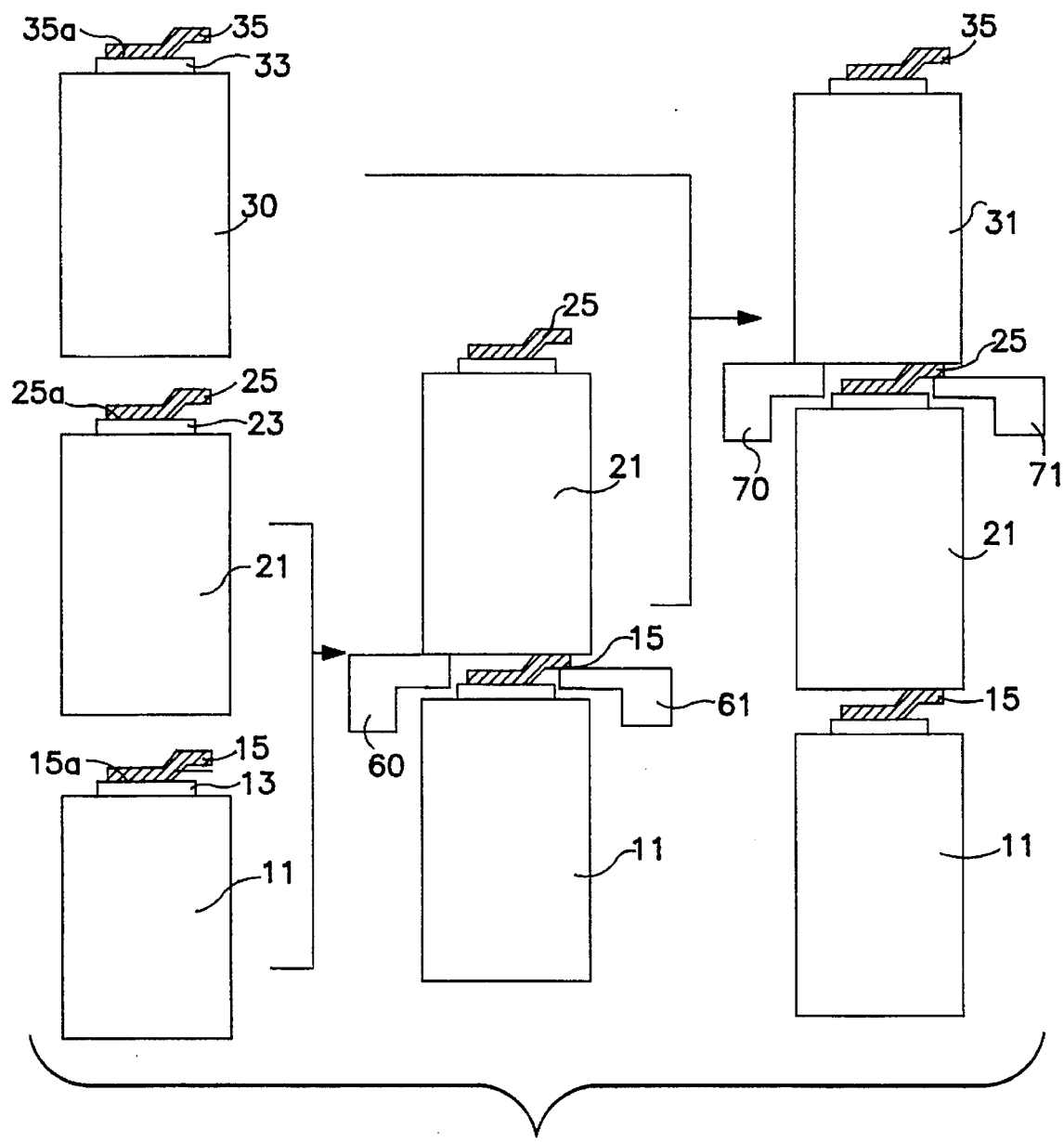
FIG. 6 is a schematic diagram of an alternative method of manufacturing a multicell battery for connecting three cells in series.

A different embodiment of a manufacturing method of a multicell battery including three or more cells in series is described below with reference to FIG. 6. FIG. 6 is a schematic diagram of another manufacturing method of a multicell battery by connecting three cells in series.

Lead tabs are welded to convex electrode terminals of respective cells individually. That is, a first end 15a of a first lead tab 15 is welded to a first electrode terminal 13 of a first cell 11. A first end 25a of a second lead tab 25 is welded to a third electrode terminal 23 of a second cell 21. A first end 35a of a third lead tab 35 is welded to a fifth electrode terminal 33 of a third cell 31.

The second cell 21 welded to the second lead tab 25 is welded in series to the first cell 11 welded to the first lead tab 15, in the same manner as in the first embodiment, by using a first weld electrode 60 and a second weld electrode 61.

Then, the third cell 31 welded to a first end 35a of the first lead tab 35 is welded in series to the second cell 21, in the same manner as in the first embodiment, by using a third weld electrode 70 and a fourth weld electrode 71. In this case, instead of the third weld electrode 70 and fourth weld electrode 71, the first weld electrode 60 and second weld electrode 61 may be used. In this manner, the multicell battery including three cells connected in series is manufactured.

By repeating this manufacturing method, a multicell battery composed of any desired number of cells can be manufactured.

Embodiment 4

Figure 7:
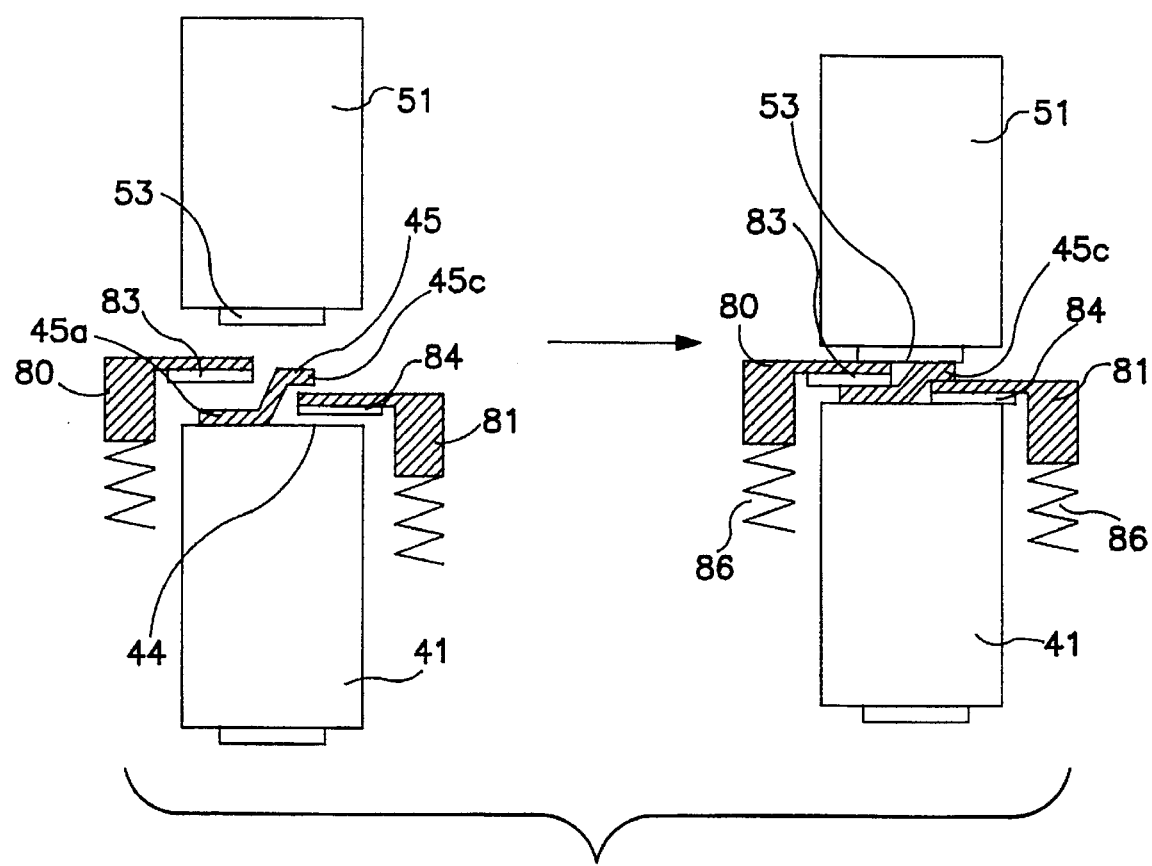
FIG. 7 is a schematic diagram of another embodiment of a method of connecting two cells according to the invention.
Figure 8:
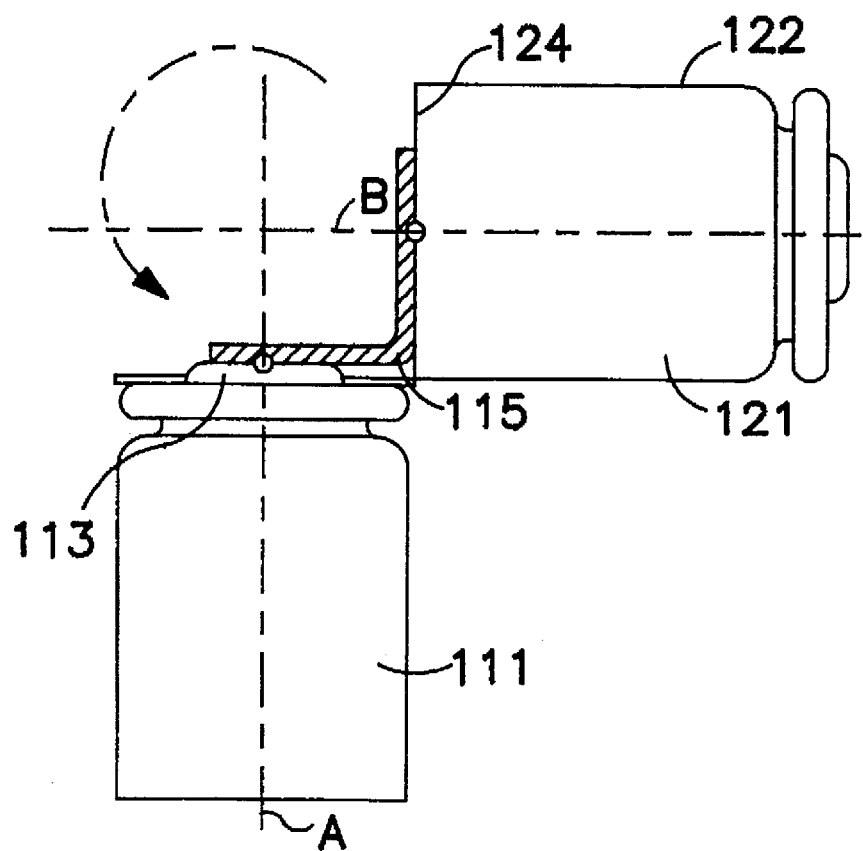
FIG. 8 is a diagram illustrating a conventional method of manufacturing a multicell battery.

Referring now to FIG. 7, another embodiment of connecting two cells in a manufacturing method of a multicell battery of the invention is described below.

FIG. 7 is a schematic diagram showing the state of two cells before welding and during welding in a manufacturing method of a multicell battery of the invention. In FIG. 7, a first end 45a of a lead tab 45 is welded to a second electrode terminal 44 of a first cell 41. A second cell 51 is disposed in series above the first cell 41 welded to the lead tab 45. A first weld electrode 80 is positioned between one end of the second electrode terminal 44 of the first cell 41, and one end of a first electrode terminal 53 of the second cell 51. Between the other end of the first electrode terminal 53 of the second cell 51 and the other end of the second electrode terminal 44 of the first cell 41, a second end 45c of the lead tab 45 and a second weld electrode 81 are positioned. In this case, the second weld electrode 81 is positioned so that the second end 45c of the lead tab 45 may be positioned between the second weld electrode 81 and the first electrode terminal 53 of the second cell 51. Moreover, an electric insulator panel 83 is disposed at the lower side of the first weld electrode 80, and an electric insulator panel 84 is disposed at the lower side of the second weld electrode 81.

Consequently, the second cell 51 moves downward. At this time, by the pressing force of the pressure adjusting springs 86, one end of the first electrode terminal 53 of the second cell 51, second end 45c of lead tab 45, and second weld electrode 81 contact each other. At the same time, the first weld electrode 80, and other end of the first electrode terminal 53 of the second cell 51 contact each other. When a proper pressing force is applied to the welding position, a current, is supplied from a welding power source (not shown) between the first weld electrode 80 and second weld electrode 81. The supplied current flows sequentially from the first weld electrode 80 into the first electrode terminal 53 of the second cell 51, the second end 45c of the lead tab 45 and the second weld electrode 81. In this case, the electric insulator panel 83 is installed at the back side of the first weld electrode 80, and electric insulator panel 84 at the back side of the second weld electrode 81, and therefore the first weld electrode 80 and second weld electrode 81 are electrically isolated without electrically connecting the second electrode 44 of the first cell 41. By this current, the first electrode terminal 53 of the second cell 51 and the second end 45c of the lead tab 45 are welded indirectly.

As described in the first embodiment, a protrusion may be formed at the second end of the lead tab, which allows the indirect welding to be done efficiently.

In this manner, the first cell 41 and second cell 51 are connected through the lead tab 45.

In the manufacturing method of a multicell battery in the second embodiment, the third embodiment, and the fourth embodiment, the same effects as in the first embodiment can be obtained. That is, the length of the lead tab can be shortened to about ½ of that used in the prior art. As the length of the lead tab is shortened, the internal resistance of the multicell battery is decreased, and hence the charge/discharge characteristics may be improved. Moreover, as the lead tab is shorter, the material cost is lowered correspondingly to the curtailed length. At the same time, the manufacturing process is simplified, and the manufacturing cost is lowered, and industrial mass production is realized.

What is claimed:

1. A method of manufacturing a multicell battery by connecting a plurality of cells in series, wherein the multicell battery comprises:

(1) a first cell having a first electrode terminal, and a second electrode terminal, (2) a second cell disposed in series above the first cell, having a third electrode terminal formed in the upper part, and a fourth electrode terminal formed in the lower part, and (3) a lead tab having a first end connected to the first electrode terminal of the first cell, and a second end connected to the fourth electrode terminal of the second cell;

the method comprising:
(a) connecting the first end of the lead tab to the first electrode terminal of the first cell,
(b) positioning a pair of weld electrodes consisting of a first weld electrode and a second weld electrode between the first cell and the second cell, and positioning the second end of the lead tab between the second weld electrode and the fourth electrode terminal,
(c) positioning the first cell and the second cell adjacent to each other, isolating electrically the first weld electrode and second weld electrode from the first electrode terminal, contacting the first weld electrode and one end of the fourth electrode terminal, and contacting the other end of the fourth electrode terminal, the second end of the lead tab, and the second weld electrode and
(d) applying a current between the first weld electrode and second weld electrode, and welding the fourth electrode terminal and the second end of the lead tab by the current flowing in the first weld electrode, fourth electrode terminal of the second cell, the second end of the lead tab, and the second weld electrode.

2. The method of manufacturing a multicell battery of claim 1, wherein the first electrode terminal has a convex shape, and the fourth electrode terminal has a flat shape.

3. The method of manufacturing a multicell battery of claim 1, wherein a protrusion is formed at the second end of the lead tab, said protrusion contacting the fourth electrode terminal.

4. The method of manufacturing a multicell battery of claim 1, wherein the multicell battery further comprises:
(4) a third cell having a fifth electrode terminal and a sixth electrode terminal, and
(5) a second lead tab having a first end connected to the third electrode of the second cell, and a second end connected to a sixth electrode terminal of the third cell, the method further comprising:
(f) connecting the first end of the second lead tab to the third electrode terminal of the second cell,
(g) positioning a pair of second weld electrodes consisting of a third weld electrode and a fourth weld electrode between the second cell and the third cell, and positioning the second end of the second lead tab between the fourth weld electrode and sixth electrode terminal,
(h) positioning the second cell and the third cell adjacent to each other, isolating electrically the third weld electrode and fourth weld electrode from the third electrode terminal, contacting the third weld electrode and an end of the sixth electrode terminal, and contacting the other end of the sixth electrode terminal, the second end of the second lead tab, and the fourth weld electrode, and
(i) applying a current between the third weld electrode and the fourth weld electrode, and welding the sixth electrode terminal to the second end of the second lead tab.

5. The method of manufacturing a multicell battery of claim 1, wherein a first electric insulator panel is installed at the first electrode terminal side of the first weld electrode, and a second electric insulator panel is installed at the first electrode terminal side of the second weld electrode.

6. A method of manufacturing a multicell battery by connecting a plurality of cells in series comprising the steps of:
(a) connecting a first end of a first lead tab to a first electrode terminal of a first cell,
(b) connecting a first end of a second lead tab to a third electrode terminal of a second cell,
(c) connecting a first end of a third lead tab to a fifth electrode terminal of a third cell,
(d) positioning a first pair of weld electrodes consisting of a first weld electrode and a second weld electrode between the first cell and the second cell, and positioning the second end of the first lead tab between the second weld electrode and a fourth electrode terminal of said second cell,
(e) positioning the first cell and second cell adjacent to each other, isolating electrically the first weld electrode and second weld electrode from the first electrode terminal, contacting the first weld electrode and an end of the fourth electrode terminal, and contacting the other end of the fourth electrode terminal, the second end of the first lead tab, and the second weld electrode,
(f) applying a current between the first weld electrode and second weld electrode, and welding the fourth electrode terminal and the second end of the first lead tab,
(g) positioning a second pair of weld electrodes consisting of a third weld electrode and a fourth weld electrode between the second cell and the third cell, and positioning the second end of the second lead tab between the fourth weld electrode and a sixth electrode terminal of said third cell,
(h) positioning the second cell and third cell adjacent to each other, isolating electrically the third weld electrode and the fourth weld electrode from the third electrode of the second cell, contacting the third weld electrode and an end of the sixth electrode terminal, and contacting the other end of the sixth electrode terminal, second end of the second lead tab, and the fourth weld electrode, and
(i) applying a current between the third weld electrode and the fourth weld electrode, and welding the sixth electrode terminal and the second end of the second lead tab.

7. The method of manufacturing a multicell battery of claim 6, wherein the first electrode terminal has a convex shape, and the fourth electrode terminal has a flat shape.

8. A method of manufacturing a multicell battery by connecting a plurality of cells, each cell of the plurality of cells having a convex electrode terminal in an upper part and a flat electrode terminal in a lower part, the method comprising:
(1) connecting an end of a lead tab to a convex electrode terminal of one cell of said plurality of cells,
(2) positioning the convex electrode terminal of the one cell connected to the lead tab, adjacent to a flat electrode terminal of another cell out of the plurality of cells, (3) positioning a pair of weld electrodes having first weld electrode and second weld electrode between the cell and the other cell, contacting the first weld electrode with one end of the flat electrode terminal of the other cell, and contacting the second weld electrode with the other end of the flat electrode terminal of the other cell through the other end of the lead tab, and (4) passing a current between the first weld electrode and the second weld electrode, and welding the other end of the flat electrode terminal of the other cell and the other end of the lead tab, by the current flowing from the first weld electrode into the flat electrode terminal of the other cell, the other end of the lead tab, and the second weld electrode.

9. The method of manufacturing a multicell battery of claim 8, wherein a protrusion is formed at the other end of the lead tab, and this protrusion contacts the flat electrode terminal of the other cell.

\* \* \* \* \*